March 20, 1956  O. E. HINTZ ET AL  2,738,717
STALK DIGGER AND CHOPPER
Original Filed Oct. 15, 1951  3 Sheets-Sheet 1

INVENTORS.
Otto E. Hintz
Arthur H. Nakata
Paul O. Pippel
Atty.

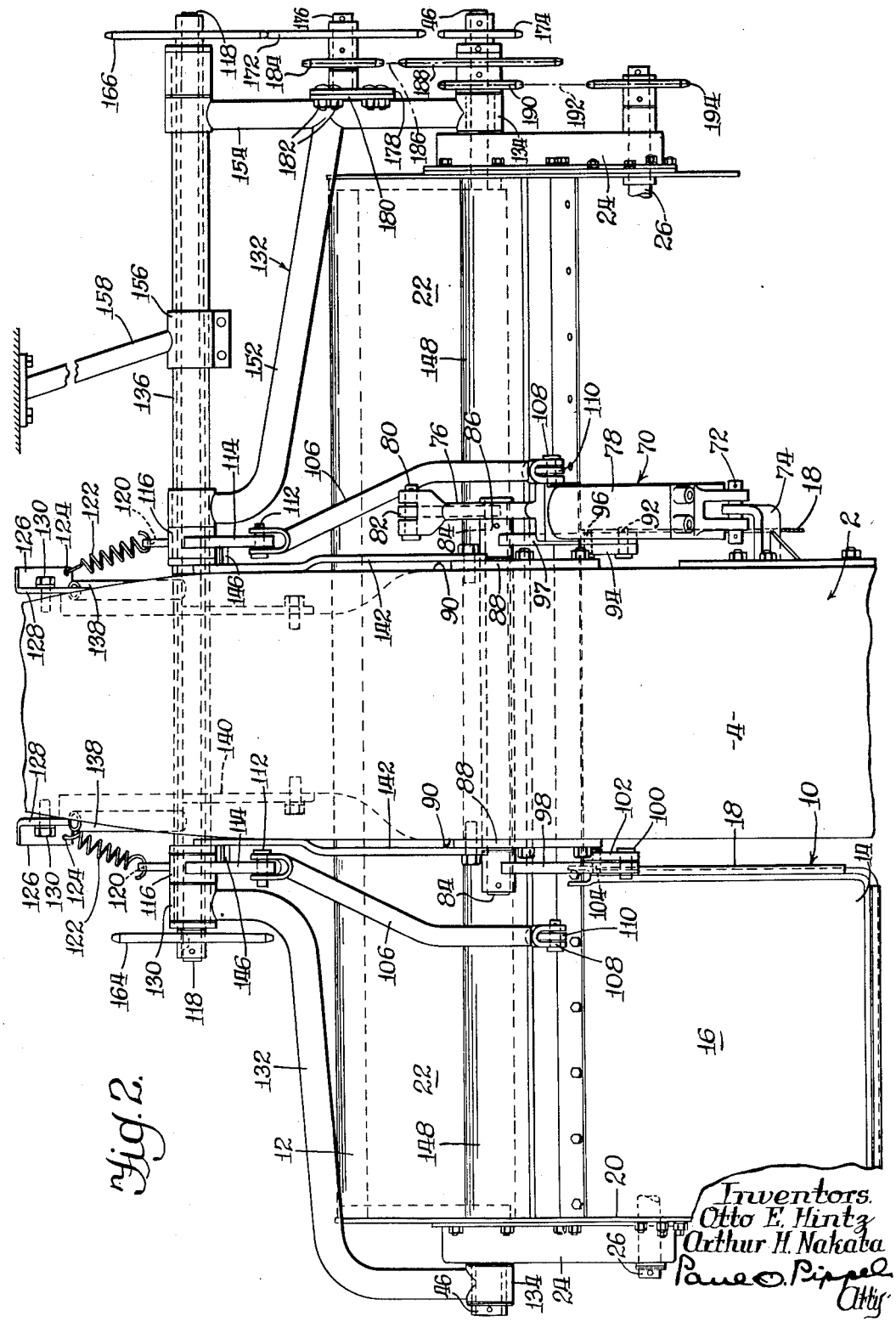

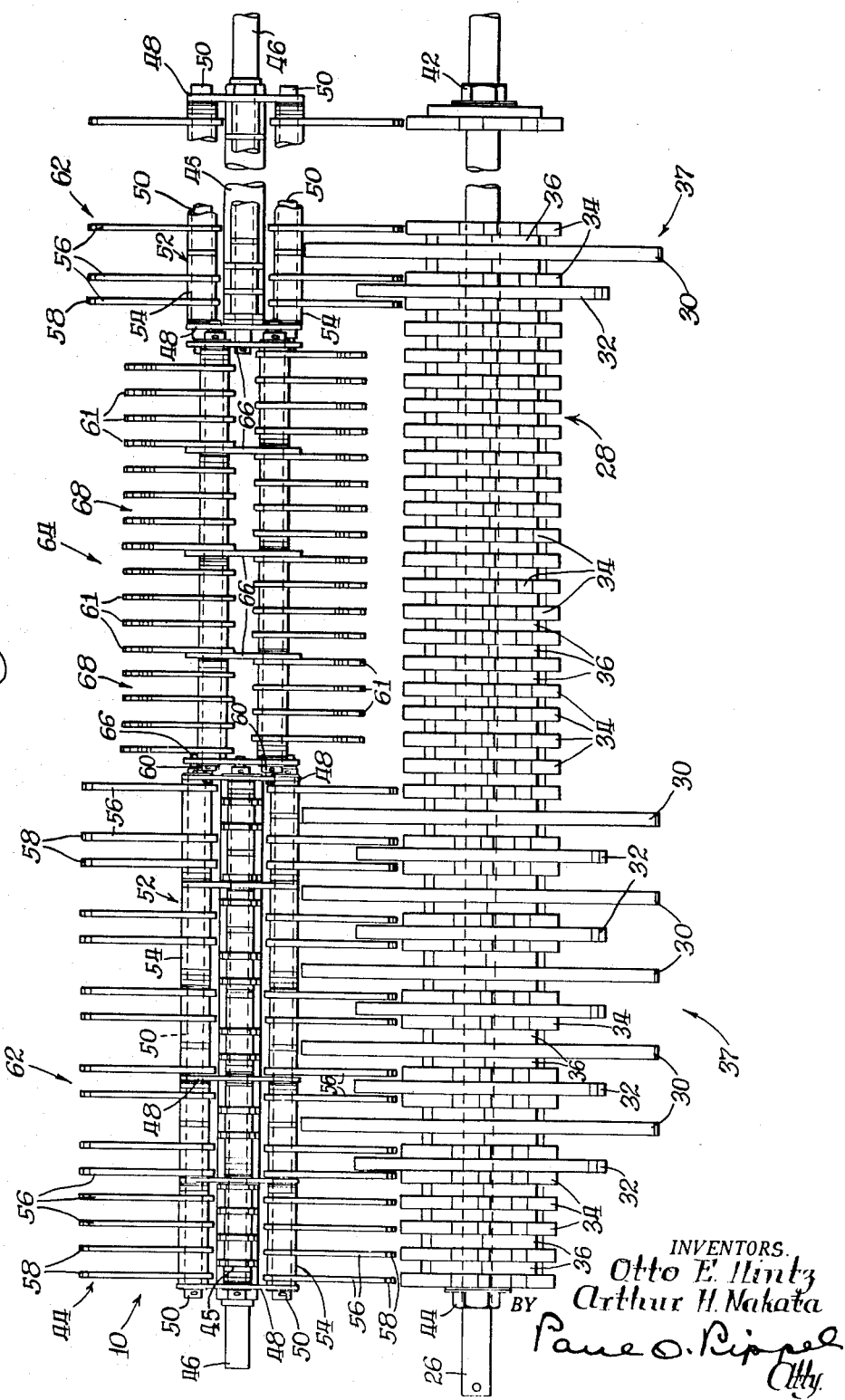

United States Patent Office 2,738,717
Patented Mar. 20, 1956

2,738,717

STALK DIGGER AND CHOPPER

Otto E. Hintz, Riverside, and Arthur H. Nakata, Chicago, Ill., assignors to International Harvester Company, a corporation of New Jersey Original application October 15, 1951, Serial No. 251,336. Divided and this application November 1, 1952, Serial No. 318,268

5 Claims. (Cl. 97—40)

This invention relates to a stalk digger and chopper mechanism and more particularly to a novel unit for uprooting and comminuting cotton stalks or other bushy plants. This application is a division of applicants' application Serial No. 251,336, filed October 15, 1951, for Stalk Digger and Chopper, now Patent No. 2,718,109, issued September 20, 1955.

A general object of the invention is to provide a simple and compact unit which is adapted to be mounted beneath the waist of the conventional tractor and powered from the side power take-off thereof.

A further object of the invention is to provide a multi-row unit elongated transversely of the tractor and comprising a forward digger drum assembly and a shredder drum assembly to the rear thereof, the drums having interdigitating fingers arranged to shear the stalks therebetween.

A further object is to devise a novel two-row unit affording substantially balanced stressed distribution.

A more specific object is to provide such unit incorporating a forward digger component cooperatively associated with a shredder component therebehind, both components being supported from an associated tractor by a novel linkage formed and arranged to lower the unit to operating position and to raise the unit to transport position, the linkage being designed to move the forward component a greater range upwardly and downwardly than the shredder component in order to effectively clear the ground when in transport position and to obtain purchase in the ground when in operating position.

The invention comprehends the positioning of a shredder drum assembly on a generally horizontal axis transversely of the line of draft of the unit and upwardly and rearwardly of the digger drum which operates on an axis parallel to the drum axis, the digger drum assembly being arranged to swing about the axis of the shredder drum for positioning in operating and transport positions.

These and other objects of the invention will become more apparent from the specification and the drawings wherein:

Figure 2 is a fragmentary top plan view with the tractor shown fragmentarily diagrammatically, and Fig. 3 is a top view of the digger and shredder components disassociated from the remainder of the mechanism.

Figure 1:
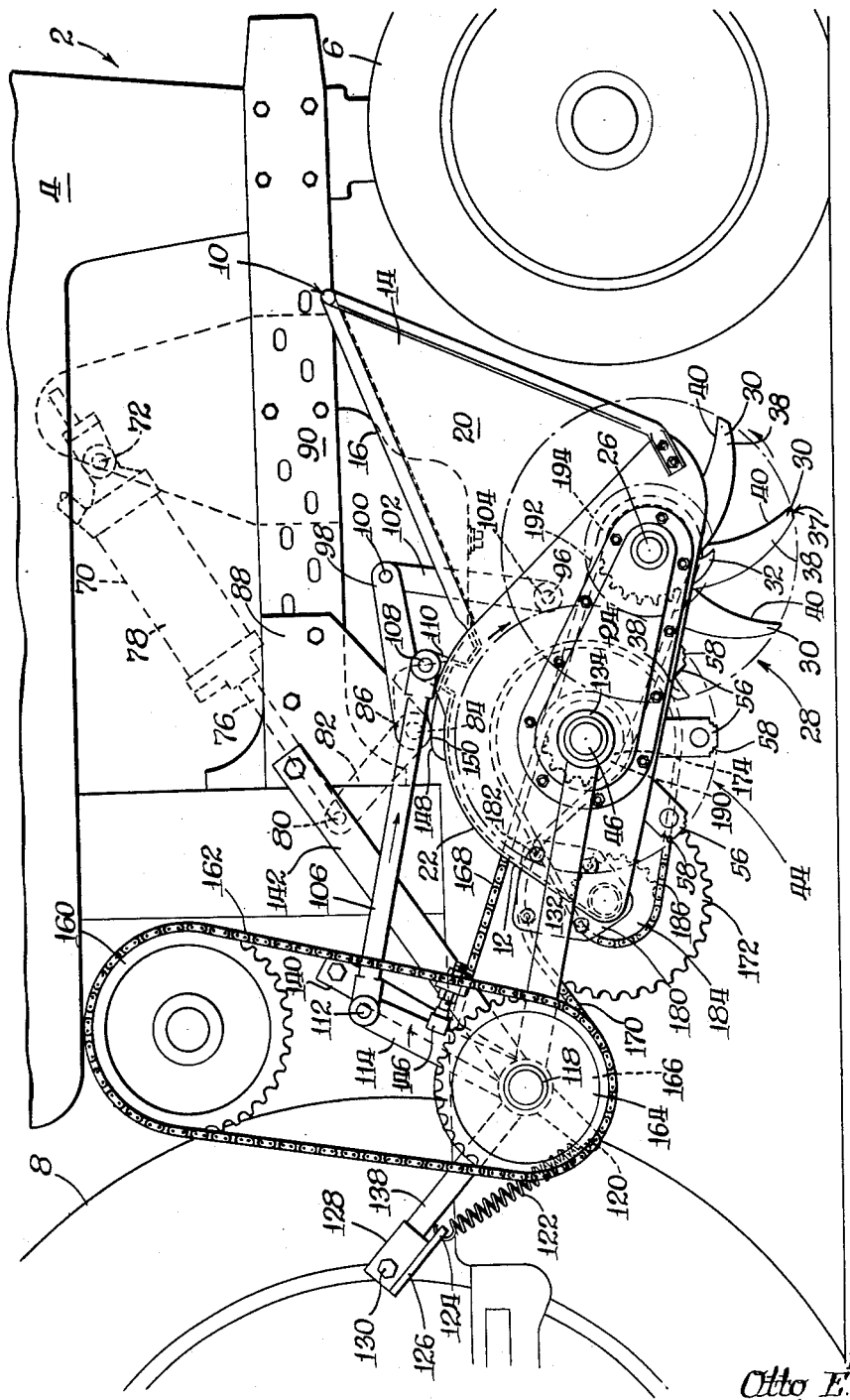
Figure 1 is a side elevational view of the unit shown applied to the tractor and in an intermediate position immediately prior to the raising of the forward component or to the lowering of the entire unit.

Describing the invention in detail, the tractor generally designated 2 may be of conventional design comprising a waist structure 4 carried at its forward end by a narrow steering truck 6 and at its rear end through conventional housing from a traction wheel 8 at each side thereof.

The combination digger and comminuting or shredder unit 10 is disposed beneath the waist 4 of the tractor and comprises a housing structure 12 elongated transversely of the tractor and extending outwardly from opposite sides thereof and including a forwardly open shroud 14 adjacent each end thereof. Each shroud includes a top panel 16 and inboard and outboard panels 18 and 20 depending therefrom. The inboard panel may be of extremely short downward extent. The top panel 16 slopes downwardly, rearwardly and at its rear edge is suitably connected to the forward edge of a semicylindrical top segment 22 of the housing. The outboard panels 20 of the respective shroud sections carry suitable bearing assemblies 24 through which a cross shaft 26 is journaled, the shaft 26 forming a generally horizontal rotational axis, extending transversely of the tractor, and keyed to the forward component or stalk uprooting digger drum assembly generally designated 28.

The drum assembly or fore section 28 of the implement comprises a series of discs 30, 32, and 34 and washers 36 sleeved on the shaft 26 and stacked side by side in a manner hereinafter described. Each disc comprises a plurality of radially outwardly extending fingers 38, 38 which are curved longitudinally in a direction toward their leading edges 40. It will be seen that the discs 30, 30 are substantially larger in diameter than the discs 32, 32 which in turn are substantially larger in diameter than the discs 34, the discs 30 being adapted to function as the primary diggers and obtain the deepest penetration into the earth, the discs 32 being designed as secondary diggers, that is closer to the surface, and the discs 34 being adapted to serve as trash pickers off the surface of the ground. Of course, discs 32 may be of equal size with discs 30. The arrangement of the discs 30 to 34 on the shaft is as follows:

The discs 30 and 32 are grouped adjacent each end of the shaft to provide digger sections 37, 37 within the respective shrouds and extend across and at opposite sides of an associated row of cotton plants. It will be understood that these rows are normally planted between 38 and 40 inches apart and that each grouping extends approximately 18 inches, that is a substantial distance at each side of the associated row to account for discrepancies in the planting and the bushiness of the plant. Each group may be arranged with several discs 30 flanked by two washers 36, 36 which are disposed between discs 34, 34 at the remote sides and seat against adjacent discs 32, 32. Outwardly of these groupings may be disposed a series of discs 34, 34 alternating with washers 36, 36 and a similar arrangement of alternating discs 34 and washers 36 may be located between these groups. The discs 34 may be substituted for washers 36. The entire assemblage may be compacted into a pile by nuts 42 and 44 (Fig. 3) threaded on opposite ends of the shaft and tightened against opposite ends of the stack of washers and discs. It will be seen that the discs 30 are thus positioned to dig into the soil on the rows and that the action is accentuated by the operation of the discs 32 and 34. Inasmuch as there are no plants growing intermediate the rows the discs 34 in those regions serve to cut up and lift the trash and weeds. It will be noted that the fingers of adjacent discs are circumferentially angularly displaced or staggered with respect to each other to provide extensive spacing therebetween to reduce clogging and also make the action more continuous.

A shredder or comminuting drum assembly component generally indicated 44 is positioned immediately to the rear of the digger drum and rotates on an axis parallel thereto and disposed slightly upwardly and to the rear thereof. The drum structure or aft section 44 of the implement may comprise an axial tube 45 with coaxial shafts 46, 46 at opposite ends thereof, the tube 45 carrying adjacent each end a plurality of circular hub members 48, 48 keyed or connected thereto and spaced axially thereof and each having a uniformly spaced series of parallel rods 50, 50 extending therethrough, each rod supporting intermediate adjacent members 48, 48 a flay assembly 52 comprising a tube 54 sleeved on the rod and connected to one of the ends of a series of outstanding parallel flays or hammers 56, 56 disposed edgewise transversely to the axis of rotation of the shredded unit or rotor beater and formed at their outer extremities with serrated edges 58 to obtain a chopping action on a stalk engaged thereby. The flays may, of course, be individual hammers spaced by washers so that each hammer rotates freely of the others. The center section of the shredder may comprise a plurality of circumferentially spaced rods 60, 60 constituting a light framework extending between the end members 48, 48 of the end sections, generally indicated 62, 62 of the shredder and suitably supported therefrom. The rods 60, 60 of the center section 64 of the shredder assembly may be spaced by a plurality of spacers 66, 66 sleeved thereon. Each rod 60 may carry a flay assembly 68 between each pair of spacers and between each spacer and the adjacent member 48, each flay unit 68 being generally similar to those heretofore described and comprising a tube rotatably mounted on the rod 60 and having outstanding fingers or hammers 61. The flay units 68 may comprise individual hammers separated by spacers. It will be noted that the hammers 56 disposed in the region of the digger discs 30 and 32 are arranged to interdigitate therewith in order to shear the stalks therebetween, whereas the hammers 56 and 61 disposed in the region of the outer ends of the digger drum and intermediate the digger sections 37, 37 are arranged to pass with their outer extremities in close proximity to the peripheries of the related discs 34. In this respect the arrangement provides for the most effective shearing action in the regions where it is required and strategically locates the various segments of each component so that it is most effectively utilized. It will be noted that the outer extremities of the shafts 46, 46 which form the axis in rotation for the comminuting assembly extend through journal bearing assemblies 24, 24 carried by the outboard panels 20, 20 of the shrouds said panels being connected at their upper edges to the lateral edges of the semicylindrical or arcuate segment 22 of the housing. The unit is moved up and down by means of a hydraulic motor 70 disposed at one side of the tractor along the waist thereof, said hydraulic unit having one end pivotally connected as at 72 on a substantially horizontal axis to a suitable bracket structure 74 mounted to a side member component on the side of the tractor. The hydraulic motor or mover slopes downwardly, rearwardly from its connection at 72 and has its lower end, which is the outer end of a piston rod 76 operating within an associated cylinder 78, connected as at 80 on a generally horizontal axis to the rear end of a bell-crank lever 82 which intermediate its ends at its elbow is connected to one end of a torque rod 84 pivoted within a torque tube 86 extending transversely beneath the waist of the tractor and adjacent each end being connected to a bracket 88 suitably bolted to a side sill 90 of the tractor. The bell-crank lever has a leg 97 extending forwardly from its elbow and at its forward end is pivoted on a general horizontal axis as at 92 to the upper end of a link 94 which at its lower end is pivoted on a substantially horizontal axis as at 96 to the inboard panel 18 of the adjacent left hand shroud. The other extremity of the torque rod 84 is connected to the rear end of a forwardly extending lever arm 98 which at its forward extremity is pivoted on a generally horizontal axis 100 to the upper end of a link 102 and the lower end of the link 102 being pivoted as at 104 to the inboard panel 18 of the adjacent shroud. It will be noted that the forward leg 97 of the bell-crank lever as well as the lever member 98 and the links depending therefrom are arranged in parallel relationship whereby rotation of the bell-crank lever in a counter-clockwise direction (Fig. 1) pursuant to the extension of the hydraulic motor, whereat the piston is moved downwardly, rearwardly, will effect upward movement of the unit with balanced action at opposite ends thereof, and conversely retraction of the hydraulic motor effects lowering of the unit.

The unit is additionally supported at each extremity thereof by means of a parallelogram linkage which is spring biased to urge the unit downwardly and additionally controls the vertical movement of the forward component of the unit with respect to the rear component as hereinafter more fully detailed. The parallelogram linkage at each side is substantially identical and comprises a top link 106 pivoted on a generally horizontal axis at its forward end as at 108 to the upper end of a lug 110 which at its lower extremity is joined to the top side of the arcuate segment 22 of the housing. The rear extremity of the link is pivoted on a generally horizontal axis as at 112 to the upper end of an upright link 114, said link member 114 being provided intermediate its ends with a sleeve 116 which is rotatably mounted on a substantially horizontal axis about a cross-shaft 118. The lower end of the link 114 is hooked as at 120 to the forward extremity of a tension spring 122, the spring 122 extending rearwardly of the link 114 and at its rear extremity being hooked as at 124 to an outstanding ear 126 of a bracket 128 which is mounted as by a bolt 130 to a side member of the tractor. The shaft 118 is ensleeved by a bearing 131 at the rear extremity of a bottom link 132 of the parallelogram linkage, the link 132 being bent outwardly intermediate its ends and then bent forwardly adjacent to its forward end and provided at the forward end with a sleeve 134 journaled on the outer extremity at the related end of the beater rotor shaft 46.

The shaft 118 extends through a torque tube 136 which is mounted to the tractor by means of a plurality of braces 138, 140 and 142 which at their lower ends are each connected to the tube 136 and diverge upwardly and at their upper ends are connected to a suitable member of the tractor.

Referring now to Figure 1 it will be noted that each spring 122 tends to rotate the associated link 114 in a clockwise direction as indicated by the arrow which in turn tends to move the upper link 106 forwardly whereby the housing is caused to rotate in a clockwise direction about the axis of the shafts 46, 46 of the hammer rotor. This action is terminated when the forward edge of the link 114 abuts against an adjustable stop 146 mounted on the adjacent brace 142 as shown in Figure 1. The disposition of the stop controls the range of movement of the top link 106 which in turn determines the extent of downward movement of the digger with respect to the hammer rotor. Any further downward movement takes place with the entire unit pivoting the linkage about the axis of the hammer rotor shaft 46, the point 108 and the point 112 of the lower link about cross shaft 118. The depth of penetration of the digger unit is controlled by the extent of the retraction of the hydraulic motor. To raise the unit from operating position to transport position, the unit is raised with the digger and hammer sections moving together to the position shown in Figure 1 by operating the hydraulic motor through the linkage connected thereto. The arcuate section of the housing is provided on its top side with a curved abutment surface 148 concentric with the axis of the hammer rotor and andapted to abut against the underside of the torque tube 86 as at 150 (Fig. 1), these parts constituting stop means. This limits upward movement of the rear component whereby further upward action of the lever members at opposite ends of the torque rod 84 effects upward rotation of the forward component with the housing about the axis of the shafts 46, 46 of the hammer rotor. This rotation is accompanied by rearward movement of the top links 106 of each parallelogram linkage and counter-clockwise rotation of the links 114 with consequent expansion of the springs 122 which afford a yieldable connection between the fore and aft sections of the implement.

It will be noted that the parallelogram linkage at the left side of the tractor (right side as viewed in the drawings) differs slightly from that on the opposite side in that the lower link 132 on the left side is bifurcated at its rear extremity and comprises inboard and outboard legs 152 and 154 each of which journaled at their rear ends on the torque tube of the cross-shaft 118, the leg 162 journaling in an area intermediate the ends of the shaft 118, and leg 154 journaling adjacent to the left end of the shaft. This construction is necessitated due to the longer extension of the shaft 118 and the torque tube thereof from the left side of the tractor and also because of the mounting of the driving elements on the left end of the unit. The tube 136 is further braced intermediate the legs 152 and 154 by a sleeve connection 156 on the forward end of a rearwardly extending brace member 158 which at its rear extremity is suitably connected to the axle housing of the tractor.

The driving arrangement for the unit comprises a sprocket 160 which forms the output of the power take-off on the right side of the tractor, the sprocket 160 driving a chain 162 which is trained about a sprocket 164 at the right end of the shaft 118 and keyed thereto. The shaft 118 is fixed at its opposite end to a sprocket 166 which drives a chain 168 which comprises a lower run 170 extending over the upper part of an idler sprocket 172 meshing therewith and then continuing under and around a sprocket 174 keyed to the hammer rotor shaft 46 at the left end thereof. The chain 168 then returns around the sprocket 166. The idler sprocket 172 is mounted on a stub shaft 176 generally parallel to the axis of rotation of the forward and rear components and of the shaft 118, the stub shaft 176 being welded or integrally united at its inboard end to a mounting plate 178 which is clamped to a mating mounting plate 180 as by bolts 182, a plate 180 being welded to the adjacent lower parallelogram link at the junction of the legs 152 and 154 thereof where, it will be noted, that the lateral extent of the leg 152 serves efficiently to prevent buckling.

The idler sprocket 172 is formed integrally on its inboard side with a smaller sprocket 184, the sprocket 184 driving the chain 186 which is trained about a larger sprocket 188 journaled on the adjacent shaft 46, the sprocket 188 being formed on its inboard side integrally with a smaller sprocket 190 driving a chain 192 which in turn drives a larger sprocket 194 mounted on the left end of the shaft of the digger unit.

Referring now to Figure 1 it will be noted that the driving arrangement is such as to drive the digger drum in a counter-clockwise direction as shown by the arrow and the hammer rotor in a clockwise direction. The rotation of the digger unit is substantially slower than the hammer rotor. In view of this disparity in the speeds it will be readily appreciated that the hammers will shear the stalks entered between same and the interdigitating discs of the digger.

We claim:

1. In a multirow digger and shredder mechanism for uprooting and comminuting stalk crops planted in rows across a field, a frame, means carried by a power driven vehicle for supporting the frame above the ground surface, a power take-off operable by said driven vehicle, a rotatably mounted drum having a group of radially disposed deep penetrating teeth adjacent to opposite ends thereof and spaced for registry with predetermined rows, said drum having other radially disposed shallow penetrating teeth of substantially lesser radial extent than said groups and disposed intermediate said groups and adapted to operate upon the ground between the rows to remove weeds and the like, drive-transmitting means interconnecting the drum with said power take-off to drive said drum whereby the peripheral speed of said drum teeth is greater than the ground speed of the power driven vehicle, a rotatably mounted beater positioned generally parallel to the drum carried by the frame and comprising a plurality of radially extensible flays, the flays adjacent to the deep teeth in said groups interdigitating therewith for shredding stalks entered therebetween pursuant to their being uprooted by said drum, the flays adjacent to the shallow penetrating teeth having outer extremities positioned to pass in closely radially outwardly spaced peripheral proximity thereto for comminuting weeds and the like entered therebetween by said shallow penetrating teeth, and means operatively connecting the beater rotor to said drive-transmitting means for rotating said beater rotor in reverse direction with respect to the direction of rotation of the drum and at a substantially higher speed than the latter and in a direction biasing said drum groundwardly in response to the reactive force resulting from comminuting action of said beater rotor against said drum teeth and means mounting said drum for vertical swinging movement about the axis of rotation of said rotor.

2. The mechanism according to claim 1 and comprising forwardly open shrouds carried by the frame above each group and encompassing the upper portions thereof and having an upper panel and spaced side panels depending from opposite edges of said upper panel and said upper panel extending diagonally downwardly rearwardly in a plane intersecting said rotor along a chord thereof and providing a guide surface leading into the rotor.

3. Apparatus for digging up and shredding row planted stalks of harvested plants with minimum disturbance of the surrounding terrain, comprising a frame adapted to be moved over the terrain in a predetermined direction, a rotatably mounted toothed digger drum and having groups of relatively long earth penetrating radially extending teeth, the groups being spaced apart axially substantially the same distance as the rows upon which they are to operate for alignment therewith, a plurality of short teeth on the drum between said groups and adapted to rake over the top of the ground thereunder between said rows, and a rotatably mounted shredder drum disposed generally parallel to said digger drum therebehind as respects said direction of movement of said frame and carried by the frame, said shredder drum comprising groups of radially extensible relatively long flays axially spaced apart and aligned with respective groups of long teeth in interdigitating relationship therewith for shredding stalks entered therebetween, said shredder drum having a plurality of relatively shorter flays intermediate said groups, said shorter flays being of a length whereby they pass in close radially spaced relationship to the short teeth of the digger drum thereadjacent, said shredder drum positioned above the ground a distance such that the longer flays thereof sweep in close proximity to the ground and the shorter flays sweep over the ground in slightly spaced relationship thereto thereabove, and means mounting said drum for up and down swinging movement relative to said rotor about the axis of rotation of said rotor.

4. In a stalk chopper and digger implement adapted to be mounted from a supporting structure, a framework including forwardly open shrouds spaced to align with specified rows of plants, a digger assembly having a shaft and a plurality of large fingered discs on the shaft located within the shrouds and extending from the bottoms thereof to obtain a relatively deep purchase into the ground, a series of relatively small fingered discs on the shaft intermediate said shrouds adapted to roll along the ground to pick trash between the rows, a beater rotor journaled from the framework rearwardly of the digger assembly generally parallel thereto and comprising a plurality of fingers certain of which being disposed in interdigitating relation with the large discs and others of which disposed with their outer ends passing close to the outer peripheries of the smaller discs to effect a shearing action on the plants entered therebetween, and means for rotating said assembly and rotor in opposite directions at different relative speeds, and means swingably supporting said assembly about the axis of said rotor for vertical movement relative thereto.

5. In a farm implement, a forward component having digger elements disposed at the plant rows, a power shaft keyed thereto, a plurality of fingered discs substantially smaller than said elements disposed intermediate the digger elements and connected to the shaft, a shredder assembly back of the forward component and including a pair of coaxial shafts positioned adjacent to the digger elements of the forward component and carrying flays interdigitating with the adjacent digger elements, and a relatively light section framework carried intermediate said shafts of the assembly, and flays carried thereby with their outer extremities passing close to the peripheries of the discs for cutting up relatively light matter such as weeds intermediate the rows or fallings from the plants, and means swingably mounting said forward component about said shredder assembly for vertical movement relative thereto.

References Cited in the file of this patent

UNITED STATES PATENTS

| Number | Name | Date |
| --- | --- | --- |
| 196,617 | Adams | Oct. 30, 1877 |
| 541,411 | Allerton et al. | June 18, 1895 |
| 1,108,319 | Bell | Aug. 25, 1914 |
| 1,320,875 | Lesh | Nov. 4, 1919 |
| 2,455,148 | Traver | Nov. 30, 1948 |
| 2,526,396 | Nowlin | Oct. 17, 1950 |